United States Patent
MacLeod

(10) Patent No.: US 11,237,883 B2
(45) Date of Patent: *Feb. 1, 2022

(54) DISTILLATION OF VARIOUS APPLICATION INTERFACE DATA STRUCTURES DISTRIBUTED OVER DISTINCTIVE REPOSITORIES TO FORM A DATA SOURCE OF CONSOLIDATED APPLICATION INTERFACE DATA COMPONENTS

(71) Applicant: Stoplight, Inc., Austin, TX (US)

(72) Inventor: Marc Baltran MacLeod, Austin, TX (US)

(73) Assignee: Stoplight, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/941,113

(22) Filed: Jul. 28, 2020

(65) Prior Publication Data

US 2021/0049052 A1 Feb. 18, 2021

Related U.S. Application Data

(63) Continuation of application No. 16/533,748, filed on Aug. 6, 2019, now Pat. No. 10,761,908, which is a
(Continued)

(51) Int. Cl.
*G06F 3/00* (2006.01)
*G06F 9/54* (2006.01)
(Continued)

(52) U.S. Cl.
CPC ............... *G06F 9/54* (2013.01); *G06F 16/22* (2019.01); *G06F 16/2379* (2019.01)

(58) Field of Classification Search
CPC ............................. G06F 9/54; G06F 16/2379
(Continued)

(56) References Cited

U.S. PATENT DOCUMENTS

| 6,178,550 B1 * | 1/2001 | Pearce ................. G06F 9/4843 711/163 |
| 2011/0099159 A1 | 4/2011 | Trevor et al. |

(Continued)

OTHER PUBLICATIONS

Uwe Pohlmann, Generating Simulink and Stateflow Models From Software Specifications/Generating Functional Mockup Units from Software Specications. (Year: 2012).*
(Continued)

*Primary Examiner* — Lechi Truong
(74) *Attorney, Agent, or Firm* — Kokka & Backus, PC

(57) ABSTRACT

Various embodiments relate generally to computer software and systems, including a subset of intermediary executable instructions constituting an communication interface between various software and/or hardware platforms, and, more specifically, to an application interface integration design management platform configured to analyze distinctive repositories (e.g., version-control application-based repositories) and identify application interface files and data components to form a consolidated data source with which to perform a unified search (e.g., a global search) to implement different portions of various application interfaces in development of application program interfaces ("APIs"), and the like. For example, a method may include indexing portions of application interfaces disposed in distinctive repositories, extracting the portions of application interfaces for storage in a consolidated data storage to facilitate, among other things, a unified search operation over data derived from multiple repositories.

20 Claims, 8 Drawing Sheets

Related U.S. Application Data continuation-in-part of application No. 16/174,870, filed on Oct. 30, 2018, now Pat. No. 10,802,891.

(51) Int. Cl.
*G06F 16/23* (2019.01)
*G06F 16/22* (2019.01)

(58) Field of Classification Search
USPC .......................................................... 719/328
See application file for complete search history.

(56) References Cited

U.S. PATENT DOCUMENTS

| | | | | |
|---|---|---|---|---|
| 2011/0165551 | A1* | 7/2011 | Yamazaki | G01C 21/36 434/365 |
| 2012/0239960 | A1* | 9/2012 | Priel | G11C 7/1051 713/400 |
| 2013/0111505 | A1 | 5/2013 | Frick et al. | |
| 2017/0235848 | A1* | 8/2017 | Van Dusen | G06F 16/904 705/12 |
| 2018/0004503 | A1* | 1/2018 | OlmstedThompson | G06F 9/45533 |
| 2019/0205856 | A1 | 7/2019 | Bell et al. | |
| 2020/0133744 | A1 | 4/2020 | MacLeod et al. | |
| 2020/0226002 | A1* | 7/2020 | MacLeod | G06F 9/5072 |

OTHER PUBLICATIONS

Asma El Hamzaoui1, Model Checking of WebRTC Peer to Peer System. (Year: 2019).*
Amazon API Gateway, Amazon Web Services, Inc., https://docs.aws.amazon.com/apigateway/latest/developerguide/welcome.html.
Curl, Stenberg, Daniel, https://curl.haxx.se.
Mudrick, Timothy A., Notice of Allowance and Fee(s) Due dated Jun. 12, 2020 for U.S. Appl. No. 16/174,870.
OpenAPI Initiative, The Linux Foundation, openapis.org/; Published Feb. 20, 2020.
OpenAPI Specification, The Linux Foundation, https://github.com/OAI/OpenAPI-Specification.
Swagger Editor, SmartBear Software, Inc., https://swagger.io/tools/swagger-editor/.
Troger, Peter et al., "Standardization of an API for Distributed Resource Management Systems," Seventh IEEE International Symposium on Cluster Computing and the Grid (CCGrid '07), Rio De Janeiro, 2007.
Troung, Lechi, Notice of Allowance and Fee(s) Due dated Apr. 29, 2020 for U.S. Appl. No. 16/533,748.

* cited by examiner

DISTILLATION OF VARIOUS APPLICATION INTERFACE DATA STRUCTURES DISTRIBUTED OVER DISTINCTIVE REPOSITORIES TO FORM A DATA SOURCE OF CONSOLIDATED APPLICATION INTERFACE DATA COMPONENTS

CROSS-REFERENCE TO RELATED APPLICATIONS

This application is a continuation application of U.S. patent application Ser. No. 16/533,748, filed on Aug. 6, 2019, now U.S. Pat. No. 10,761,908 and titled "DISTILLATION OF VARIOUS APPLICATION INTERFACE DATA STRUCTURES DISTRIBUTED OVER DISTINCTIVE REPOSITORIES TO FORM A DATA SOURCE OF CONSOLIDATED APPLICATION INTERFACE DATA COMPONENTS," U.S. patent application Ser. No. 16/533,748 is a continuation-in-part ("CIP") application of U.S. patent application Ser. No. 16/174,870, filed on Oct. 30, 2018, now U.S. Pat. No. 10,802,891 and titled "APPLICATION INTERFACE GOVERNANCE PLATFORM TO HARMONIZE, VALIDATE, AND REPLICATE DATA-DRIVEN DEFINITIONS TO EXECUTE APPLICATION INTERFACE FUNCTIONALITY," all of which are herein incorporated by reference in their entirety for all purposes.

FIELD

Various embodiments relate generally to computer software and systems, including a subset of intermediary executable instructions constituting an communication interface between various software and/or hardware platforms, and, more specifically, to an application interface integration design management platform configured to analyze distinctive repositories (e.g., version-control application-based repositories) and identify application interface files and data components to form a consolidated data source with which to perform a unified search (e.g., a global search) to implement different portions of various application interfaces in development of application program interfaces ("APIs"), and the like.

BACKGROUND

Advances in computing hardware and software have facilitated decentralization of computing tasks to increasing numbers of networked service applications, servers, and repositories, which collectively (and conceptually) has become known as "the cloud" or "cloud computing," which includes implementations of "virtual private cloud" ("VPC"). As demand for cloud-based services increases, requirements to facilitate data connectivity increases exponentially among different applications residing on different computing hardware platforms in different networks. Consequently, numerous application programming interfaces ("APIs") have are being developed to provide data-interpretive communication conduits through which to exchange data and instructions among disparate operating systems, applications, and computing devices. Many different approaches to create APIs have led to the creation and use of various ad hoc and non-standard APIs, most of which are generally created for specific or one-time use and not well-suited for reuse or adoption.

Further, principles of designing and developing APIs have increasingly implemented the use of "microservices" architectures and/or "containerization" techniques (e.g., encapsulating an API in a software-based container to operate in its own environment). For example, APIs developed consistent with a microservice architecture may typically be enterprise-focused, or business-oriented to enhance productivity of an organization. APIs developed in accordance with a microservice architecture is intended to facilitate development, deployment, and management of services independently, with each service being developed by a relatively smaller number of developers in contrast to developing APIs as a monolithic application.

However, there are drawbacks to developing APIs as distributed microservices. For example, different development teams may develop similar API functionalities that are usually disposed in isolated, or "siloed," repositories, whereby discovery of similar or common API functionalities by other developers may be difficult. Further, each of the different teams of developers typically maintains documentation of API design files and functionalities for the APIs for which they are responsible. Generally, however, documentation for APIs in an enterprise or organization are commonly maintained in balkanized computing systems and data storage repositories (e.g., in fragmented repositories). Usually, developers of separately-developed APIs may conventionally create separate web pages that may provide API documentation for the APIs they developed. However, such API documents are implemented in isolation from other web-based API documents, whereby separate web pages direct to each API may omit information that might be common to other APIs documented in other web pages. Knowledge of each functionality and type of API in an organization is further frustrated by rapid scaling and complexity in the increasing number of independent versioned APIs (e.g., enterprises may develop hundreds to hundreds of thousands of API design files, versions, API data components, etc.). Also, accessibility of each of the distributed services and/or API design files stored in multiple repositories may operate independently, and, as such, interoperability of a subset of API data components may be susceptible to downtime or outages. Hence, newly designed APIs based on inaccessible API data may affect (e.g., delay) development of APIs in an organization.

Thus, what is needed is a solution for facilitating techniques to analyze, identify, and search over distinctive repositories to, among other things, enhance reusability of application interface data components to reduce consumption of computational resources as well as API development efforts and time, without the limitations of conventional techniques.

BRIEF DESCRIPTION OF THE DRAWINGS

Various embodiments or examples ("examples") of the invention are disclosed in the following detailed description and the accompanying drawings.

DETAILED DESCRIPTION

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims, and numerous alternatives, modifications, and equivalents thereof. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

Figure 1:
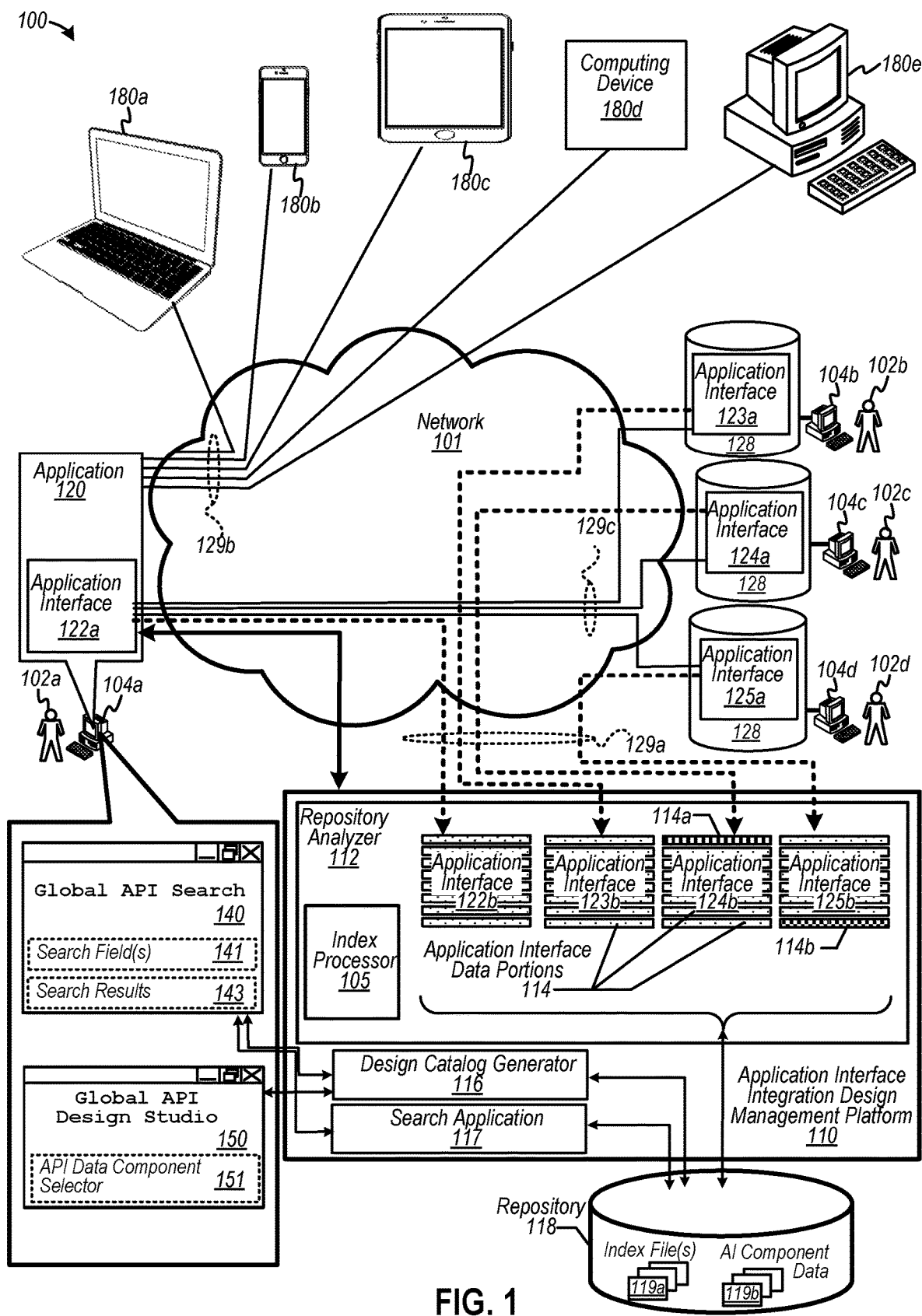
FIG. 1 is a diagram depicting an example of an application interface integration design management platform, according to at least some embodiments.

FIG. 1 is a diagram depicting an example of an application interface integration design management platform, according to at least some embodiments. Diagram 100 depicts an application interface integration design management platform 110 configured to provide computerized tools (e.g., user interfaces configured to interact with applications, computer systems, etc.) to 'manage' 'design' of application interfaces, including application programming interfaces ("APIs"), such as the design or development of an application interface 122a, based on 'integration' of other application interfaces, such as application interfaces 123a, 124a, and 125a, or portions thereof (e.g., application interface components, including API artifacts or portions). An application interface may include data constituting an application programming interface, or "API", at least in some examples. In some cases, the term "application interface" may be used interchangeably with the term "application programming interface." As an example, application interface integration design management platform 110 may be configured to analyze distinctive repositories 128 to identify application interface files and data components, including API artifacts, stored therein. Hence, platform 110 may be configured to analyze application interfaces 122b, 123b, 124b, and 125b, or portions 114 thereof (e.g., extracted application interface components). Application interface integration design management platform 110 may be further configured to extract and store application interface components in a repository, such as repository 118, to form a "consolidated" data source. A consolidated data source may facilitate implementation of a unified search on data stored in the consolidated data source (e.g., repository 118) to search for constituent API components, such as application interface components 114. Search results may be configured to identify application interface components 114 that may be suitable for integration into, for example, a newly designed API, such as application interface 122a. In accordance with various examples, a unified search may be a search performed over repositories of an enterprise or organization (i.e., a "global" search), or the search may be performed over repositories of an organization and any number of accessible external repositories (e.g., to form a virtual private cloud, or VPC, with other entities or organizations).

In view of the foregoing, application interface integration design management platform 110 may be implemented in accordance with various functions and/or structures described herein, to, among other things, form a consolidated data source of application interfaces (or APIs) and components thereof. In some examples, a consolidated data source may provide a centralized or unitary source of application interface data (e.g., derived from one or more distinctive repositories 128), where repository 118 may be configured to provide a "global" view (e.g., overview) of, or access to, portions of application interfaces developed by an organization (e.g., by distinctive API developer teams) that may be disposed in distinctive repositories 128. In some cases, repositories 128 may be physically or geographically located remotely from each other, or may be under control of responsible business units of an enterprise. In at least one example, repositories 128 may be configured to operate as version control application-based repositories under control of a version-tracking application, such as a Git™ application developed by Linus Torvalds and maintained as "Git Project" by Software Freedom Conservancy, Brooklyn, N.Y., USA. Application interface integration design management platform 110 may be configured to periodically (or aperiodically) monitor whether any of application interface data stored in one or more distinctive repositories 128 has changed, and may be further configured to update a consolidated data source for storing centralized versions of application interfaces (or portions thereof) in repository 118 to provide data synchronicity over changes in real-time (or near real-time).

In further view of the foregoing, a consolidated data storage source 118 of API component data 119b may facilitate performance of "unified" searches by an API developer 102a (via computer device 104a) to search for any application interface component, such as any of application interface data portions 114, for inclusion in a newly-generated application interface (e.g., application interface 122a). Thus, consolidated data storage 118 may provide functionality to promote visibility across various data projects of an organization, reduce friction or barriers in discovery of other application interface components of interest, and enhance reusability of application interface data components of application interfaces 123a, 124a, 125a, and any number of others (not shown). Reuse of application interface data components may reduce generation of duplicated or redundant API data files. With enhanced discovery and reusability, application interface integration design management platform 110 may be configured to reduce both consumption of computational resources associated with diagram 100 and effort and time of developer 102a during API development. Further, consolidated data storage source 118 including API component data 119b may be configured to serve as a centralized or unitary source of application interface data from which to generate (e.g., automatically) comprehensive API documentation that provides an overview of application interface components stored over multiple repositories 128. A centralized or unitary source of application interface data may also obviate "API data silos" and other non-visible or inaccessible APIs. As such, consolidated data storage source 118 may further facilitate and promote transparency and cross-organization visibility of APIs and their components. As such, any enterprise user, such as user 102a, may have access (via computing device 104a) to a global view of API documentation, which may be updated in real-time (or nearly real-time). Further, repository 118 may be configured to persist, at least in some examples, up-to-date versions (as well as earlier versions) of application interface components or artifacts. Therefore, should one of repositories 128 be rendered inaccessible (e.g., due to down-time, system upgrades, outages, etc.), developer 102a may create an API based on application interface ("API") component data 119b in repository 118 without requiring access to an originating API component that may be stored in an inaccessible repository 128. Thus, API development of application interface 122a may proceed unencumbered for at least a duration of time during which a remote application interface, such as application interface 123a, is off-line or otherwise inaccessible. The above-described functionalities of application interface integration design management platform 110 may be implemented in the various structures and/or functions set forth in accordance with various embodiments described herein. Further, application interface integration design management platform 110, and any portion thereof, may be implemented in either in hardware or software, or a combination thereof.

To illustrate operation of application interface integration design management platform 110, consider that computing device 104a may be tasked to generate and host an application 120 configured to facilitate a comprehensive service that provides, for example, on-line product offerings, ordering, and shipping of a purchased product from a third party seller and/or shipper. Developer 102a may aim to design application 120 to include one or more application interfaces to access independent services, methods, processes, or resources (e.g., as endpoints). Hence, functionality of application 120 may be based on individual services, any of which may or may not be associated with an entity or organization of which user 102a is a member. Note that in some embodiments, the term "service" may refer, at least in one example, to one or more data-driven or application-driven functions (or computer-implemented operations) at one or more endpoints accessible via one or more networked data channels, such as data channels 129b and 129c. A service endpoint may be data-driven API resource, process, or method, and may be identified as a uniform resource location ("URL"), a uniform resource identifier ("URI"), or the like.

Application 120, as a service endpoint, may receive electronic requests via data channels 129b in network 101 (e.g., the Internet or any network) from any of client devices 180a, 180b, 180c, 180d, and 180e, among any other type of client device. Thus, customers or users (not shown) associated with client devices 180a to 180e may purchase products on-line through electronic interactions with application 120. Further to this example, consider that API developer 102a is associated with other API developers 102b, 102c, and 102d, each of which may be a member of an entity, such as a corporation, organization, enterprise, etc. Also, each developer 102a, 102b, 102c, and 102d may develop different application interfaces 122a, 123a, 124a, and 125a, respectively, which may be stored at different repositories 128, any of which may be disposed at different geographic locations. Note that in some cases, one or more other API developers 102b, 102c, and 102d (and respective computing devices 104b, 104c, and 104d) may not be a member of a common organization. However, API developer 102a may be authorized to access application interfaces 123a, 124a, and 125a to, for example, implement a virtual public cloud ("VPC") through which application 120 (and application interface 122a) may electronically interact and communicate with various endpoints.

Further to the above example, consider that user 102b may develop application interface 123a via computing device 104b to provide customer-related information. For example, application interface 123a may be configured to include operations that create, update, and manage data representing customer-related information, such as a customer first name, a customer last name, an address, telephone number, payment information (e.g., credit card numbers, bank routing numbers, etc.), and the like. User 102c may develop application interface 124a via computing device 104c to facilitate financial transactions. For example, application interface 124a may be configured to include operations that create, update, and manage data representing payment-related information and functions, such as identifying a method of payment, acquiring authorization, executing payment transactions, encrypting and securing sensitive data, and confirming payment, among other information. User 102d may develop application interface 125a via computing device 104d to provide shipment-related information. For example, application interface 125a may be configured to include operations that create, update, and manage data representing shipment-related information and functions, such as identifying an ordered product, confirming inventory of the ordered product, and coordinating shipment via a carrier to a customer, and the like.

Next, consider an instance in which computing device 104a may otherwise have yet to access or discover types and functionalities of application interfaces in repositories 128, and portions thereof (e.g., API component data). As such, computing device 104a may access consolidate application interface data and application interface data components during API development in a consolidated fashion (e.g., via a combined operation, such as a unified search operation). According to some examples, application interface integration design management platform 110 may be configured to provide electronic visibility via computing device 104a to user 102a to analyze distinctive repositories 128 (e.g., version-control application-based repositories) and to identify application interface files and data components in consolidated data source 118 that may be relevant to the design of application interface 122a.

As shown in diagram 100, application interface integration design management platform 110 may include a repository analyzer 112, an index processor 105, a design catalog generator 116, and a search application 117. According to some examples, repository analyzer 112 may be configured to analyze repositories 128 to identify data representing application interfaces 123a, 124a, and 125a. In some cases, application interfaces 123a, 124a, and 125a may be distributed in one or more different repositories 128 managed by a version control computer-implemented application. Further, repository analyzer 112 may be configured to extract data representing application interfaces 123*a*, 124*a*, and 125*a* (or portions thereof) from one or more different repositories 128 for storage in a consolidated data arrangement (e.g., as a consolidated data source) disposed in repository 118. As shown, repository analyzer 112 may be configured to extract via data channels 129*a* application interfaces 122*a*, 123*a*, 124*a*, and 125*a* to form extracted application interfaces 122*b*, 123*b*, 124*b*, and 125*b*, respectively. Diagram 100 further depicts that repository analyzer 112 may be configured to identify portions 114 of extracted application interfaces 122*b*, 123*b*, 124*b*, and 125*b* as application interface data components. Further, repository analyzer 112 may be configured to "break apart," separate, uniquely identify, decompose, or distill application interfaces 122*a*, 123*a*, 124*a*, and 125*a* to form portions 114 of extracted application interfaces 122*b*, 123*b*, 124*b*, and 125*b*, which are depicted in diagram 100 as "constituent components" 114.

To illustrate, consider that application interfaces 122*a*, 123*a*, 124*a*, and 125*a* may be designed to comply with a particular application interface specification (e.g., OpenAPI Specification version 3.0.2, or later, or earlier, such as version 2.0). Or, consider that any of application interfaces 122*a*, 123*a*, 124*a*, and 125*a*, if not compliant with OpenAPI (e.g., a legacy API), may be transmuted or transformed into a correlatable API definition file or format that may be correlated with a common API specification, such as an OpenAPI specification. In various examples, any of application interfaces 122*a*, 123*a*, 124*a*, and 125*a* may be designed to include similar, equivalent, or correlatable objects, properties, methods, models, parameters, and the like. For example, application interfaces 122*a*, 123*a*, 124*a*, and 125*a* may include root objects, such as object types including server objects, path objects, component objects, security objects, tag objects, etc., and any sub-object or portion thereof. Further, other object types (e.g., associated with nested or sub-objects) may include similar or equivalent operation objects or methods (e.g., GET, PUT, POST, DELETE operations), as well as similar, equivalent, or correlatable objects associated with REQUEST objects (e.g., REQUESTBODY objects) or RESPONSES objects, and the like. In some cases, application interfaces 122*a*, 123*a*, 124*a*, and 125*a* may include an application interface data portion 114 that may reference a common subset of data (e.g., via a reference, such as $ref, to identify a common or duplicative portion of an API definition that may be accessed at a location at which data resides. In view of the foregoing, repository analyzer 112 may be configured to identify portions 114 (e.g., divisible and identifiable based on being an object, property, method, model, parameter, attribute, etc.) of extracted application interfaces 122*b*, 123*b*, 124*b*, and 125*b*. As shown in diagram 100, identified portions 114 may be decomposed, distilled, or separated into constituent components 114 of API or API data.

Index processor 105 may be configured to index data in portions 114 of extracted application interfaces to store subsets of application interface data components 114 in a centralized data arrangement, at least in some examples. Index processor 105 also may be configured to associate or link a unique identifier to distinctly identify each portion 114 of the application interfaces that may be stored as a unit (e.g., as a record) of API component data 119*b* in a consolidated data storage device (e.g., repository 118). In some examples, index processor 105 may identify attributes of constituent API component data 114 to characterize each subset of API component data 114. For example, index processor 105 may identify attributes of a subset of API component data 114 to describe one or more of an object type (e.g., a GET operation, or URL path), a property type (e.g., an object description or data type), a parameter, and a string (e.g., a string "payment" or string "customer" in, for example, an objection description). Identified attributes may thereby be used to characterize a subset of API component data 114 for identification purposes during a search, and, in some cases, the identified attributes may be stored as "fields" or one or more subsets of index file data 119*a* (e.g., columns of field data). Index file data 119*a* may be stored in repository 118. In some examples, one or more subsets of index file data 119*a* may provide data arrangements to relate the above-identified unique identifiers to a subset of attribute data that may describe a corresponding subset (or record) of API component data 114. In at least one implementation, unique identifiers may be generated as a key or a "hash" based on performing a hash function on a corresponding subset of attribute data to uniquely identify and locate a record of API component data 119*b*. According to at least one example, index processor 105 may be configured to determine dependencies among different portions 114 of extracted application interfaces so as to preserve sufficient or correct orders of operation among different constituent components 114 from a common application interface, or among different application interfaces.

In additional examples, a unit of API component data 119*b* may be stored as a "record" in one or more database files or tables. Index processor 105 may be configured to index portions 114 of the extracted application interfaces to include metadata. Examples of metadata include metadata generated in association with an operation of a version control computer-implemented application (e.g., a Git-based version control application), whereby such metadata may include a version number, commit status, commit date, author, file names, tracking or origination data, and other data that may describe an indexed portion 114 to be stored as a record including API component data 119*b*. In other examples, each record or unit of API component data 119*b* may be associated with, or otherwise stored in, a graph-based data structure.

Search application 117 includes executable instructions to cause presentation of a multi-repository search interface, such as a "Global API Search" interface 140 that may be configured to search a unified data arrangement including data from multiple repositories in consolidated data repository 118. For example, search application may be configured to cause presentation of user inputs, such as one or more search fields 141 (or any other UI input) that may be configured to select or input a subset of search criteria data with which to search API component data 119*b* to generate search results. The search rules subsequently may be presented in a user interface portion shown as "Search Result(s)" 143. To initiate a search, search application 117 may include data representing search criteria, such as data representing one or more of an object type (e.g., search for "payment" file names, search for "path" object types, search for "/GET" operations, etc.), a property type (e.g., a data type specifying a number representing currency, etc.), a parameter, and/or a string (e.g., a description specifying text strings including "'credit' 'card' 'payment' 'information',' etc.). Hence, search criteria data may include data representing one or more of a path object, an operation object, a requestbody object, and/or a response object, and any data associated therewith. In some examples, an object type subject to a search may be associated with an application interface definition file or specification. In some examples, search application 117 may be configured to access index file data 119a to facilitate a search operation, retrieve search results, and cause presentation of at least a subset of search results in UI portion 143.

Returning to the above example in which developer 102a desires to generate an application interface 122a using other application interfaces 123a, 124a, 125a, developer 102a may activate search application 117 to specify a search of an aggregation of API component data 119b extracted or derived from any number of distinctive repositories 128. In one or more searches performed via user interface 150, a search relating to a "customer information service" may cause generation of search results 143 indicating that application interface 122a can generate requests and receive responses via data channels 129c in network 101 to, for example, create, update, and manage data representing customer-related information, such as a customer first name, a customer last name, an address, telephone number, etc. Another search relating to "payment APIs that provide a payment service" may retrieve indications that application interface 124a may be relevant. Application interface 124a may be configured to create, update, and manage data representing payment-related information and functions, such as identifying a method of payment, acquiring authorization, executing payment transactions, encrypting and securing sensitive data, and confirming payment, among other information. In yet another search, search criteria specifying "APIs to ship an ordered product via a shipment service" may cause an indication that application interface 125a is relevant. For example, application interface 125a may be configured to provide shipment-related information, and may further be configured to create, update, and manage data representing shipment-related information and functions, such as identifying an ordered product, confirming inventory of the ordered product, and coordinating shipment via a carrier to a customer, and the like.

Note that search application 117 need not return an entire application interface as part of a search result, and thus not need to return all constituent components 114 from any of extracted application interfaces 122b, 123b, 124b, and 125b. Rather, search application 117 may interoperate with index files 119a to identify a record including portion 114a of application interface 124b (e.g., a subset of functionality of a payment API) rather than entire extracted application interface 124b. Also, search application 117 may also identify a record including portion 114b of extracted application interface 125b (e.g., as a subset of functionality of a shipping API) rather than entire extracted application interface 125b.

To generate a new API (e.g., application interface 122a) based on portions 114a and 114b of extracted application interfaces 124b and 125b, respectively, developer 102a may access an API design tool to implement a user interface ("Global API Design Studio") 150. Both portions 114a and 114b of may be configured to persist in repository 118. In one example, design catalog generator 116 may be configured to generate a list of constituent components 114 that may be relevant for presentation to developer 102a in a user interface portion ("API Data Component Selector") 151, which may include one or more user inputs configured to cause generation of a design or API build (e.g., via a build operation). Upon selection of portions 114a and 114b to create application interface 122a, design catalog generator 116 may be configured to integrate portions 114a and 114b, including other constituent portions 114 that may be implemented by the selected portions 114a and 114b, to generate a new API. Hence, design catalog generator 116 may be configured to integrate or combine corresponding source file data from portions 114a and 114b to generate a combination of source data included in a new API file. In some examples, design catalog generator 116 may include a "/GET" operation in another portion 114, which may not be selected, but may be a source of data consumed by one of the selected subsets of API component data. Also, design catalog generator 116 may fetch records in an order of operation upon which the selected constituent portions 114a and 114b may be implemented in a new API 122a.

Next, developer 102a may cause new API 122a to undergo a "commit" operation, thereby locking down application 122a in a version control-based repository (not shown). Application interface integration design management platform 110 (or any of its constituent elements) may be configured to periodically (or aperiodically) monitor whether any of application interface data stored in one or more distinctive repositories 128 has changed in real-time (or near real-time). In this case, new API 122a may be identified as a "transition of state" of repository data. For example, a transition of state may include any modification or change in data (e.g., added, deleted, revised, etc.). Hence, a transition of a state may describe a transition or change data in an API design file). In response, application interface integration design management platform 110 and any of its constituent elements may be configured to the consolidated data source of application interfaces in repository 118 to match the changes. Further, application interface integration design management platform 110 and any of its constituent elements may be configured to detect changes in any constituent components 114 upon which application 122a is built. Thus, application interface integration design management platform 110 and any of its constituent elements may be configured to update API component data 119b, which, in turn, may be used by API 122a to generate an updated version of API 122a (e.g., automatically).

Figure 2:
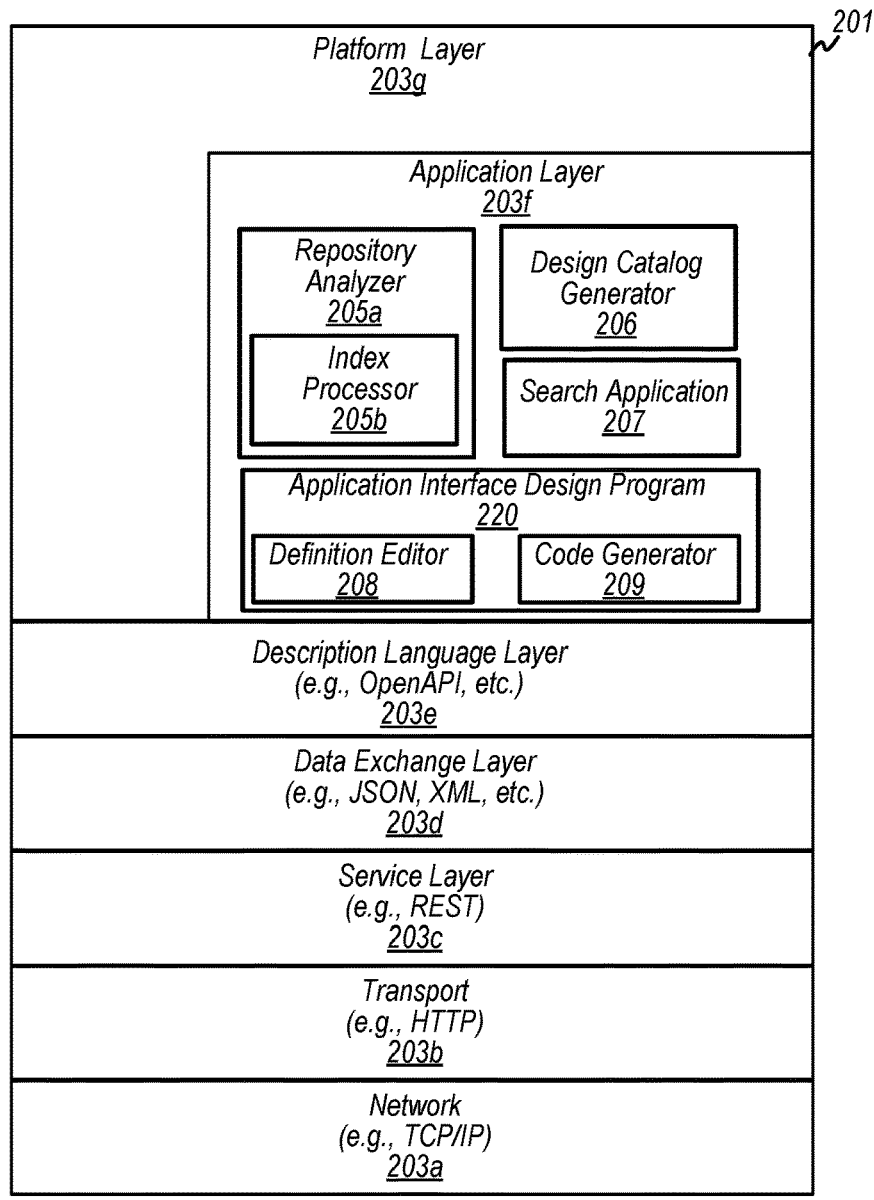
FIG. 2 illustrates an exemplary layered architecture for implementing an application interface integration design management platform, according to some examples.

FIG. 2 illustrates an exemplary layered architecture for implementing an application interface integration design management platform, according to some examples. Diagram 200 depicts application stack ("stack") 201, which is neither a comprehensive nor fully inclusive layered architecture for developing an application or platform for application interface development, including API development, as well as identifying, extracting, storing, monitoring (e.g., due to versioning), searching, and documenting application interface data components (e.g., API artifacts), among other operations. In the example shown, stack 201 includes a platform layer 203g, which may include one or more applications, frameworks, platforms, and the like to support operability of an application interface integration design management platform and/or its constituent components and processes. Further, stack 201 depicts platform layer 203g on an application layer 203f, which may be configured to implement a repository analyzer, an index processor, a design catalog generator, a search application, and an application interface design program to generate application interfaces (e.g., APIs) as application interface definitions (e.g., API definitions), among other things. In some cases, an application interface design program may optionally be disposed in, or omitted from, application layer 203f.

One or more elements depicted in diagram 200 of FIG. 2 may include structures and/or functions as similarly-named or similarly-numbered elements depicted in other drawings, or as otherwise described herein, in accordance with one or more examples, such as described relative to FIG. 1 or any other figure or description herein. For example, diagram 200 depicts application layer 203f including a repository analyzer 205a, a design catalog generator 206, and a search application 207, one or more of which may have similar structures and/or functionalities as described in FIG. 1. Note, too, that repository analyzer 205a may include an index processor 205b, which may have a similar structure and/or functionality as index processor 105 of FIG. 1.

Figure 7:
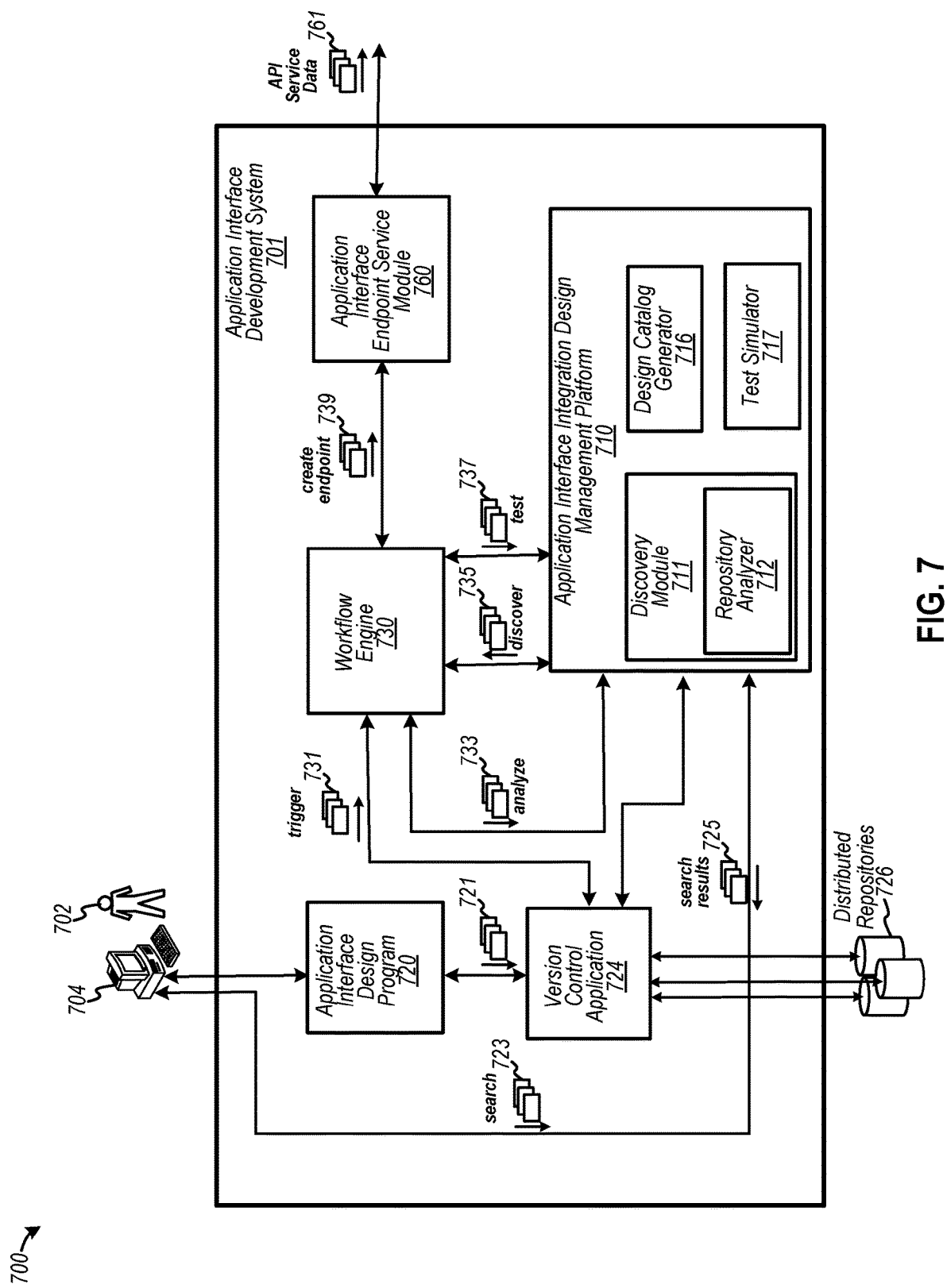
FIG. 7 is a diagram depicting an example of an application interface development system implementing an application interface integration design management platform, according to some examples.

Referring back to FIG. 2, application layer 203f may also include an application interface design program 220, which, in turn, may include a definition editor 208 and a code generator 209, either of which may be disposed locally on a computing device or hosted remotely at a platform server. Definition editor 208 may be an application configured to generate a user interface to facilitate entry of various inputs structured to populate an application interface specification, such as the OpenAPI specification, with data to create an application interface definition (e.g., an API definition). In some cases, definition editor 208 may present an API editor in a WYSIWYG-like user interface to generate operations (e.g., requests and responses relative to endpoints), models, and references to models, among other this. Examples of application interface design program 220 and/or definition editor 208 include StopLight Design Module or Stoplight API Design Studio™ (or API Designer) of Stoplight, Inc., Austin, Tex., U.S.A. In some examples, application interface design program 220 may be implemented as application interface design program 720 as depicted in FIG. 7. Referring back to FIG. 2, code generator 209 may be configured to generate API definitions in any specification-compliant format, such as JSON, YAML, RAML, XML, etc., which may be compliant with OpenAPI specifications. Further, code generator 209 may be configured to generate responses and requests in a variety of programming languages and formats, including cURL (created by Daniel Stenberg of Sweden and is maintained at curl(dot)haxx(dot)se), Python, JavaScript, Java, PHP, etc. Platform layer 203g and application layer 203f may be coded using, for example, Java®, JavaScript®, Ruby (e.g., Ruby on Rails), CSS, C+, C++, C#, C, Python™, Microsoft® .NET, PHP, Node.js, or any other structured or unstructured programming language, or any combination thereof.

Platform layer 203g and/or application layer 203f may be operably disposed on a description language layer 203e, which is a programming or structured description language to form application interface definitions in accordance with an API specification, such as the OpenAPI specification or other of the aforementioned API specification or definitions (e.g., RAML, etc.). Description language layer 203e may be disposed on Data Exchange Layer 203d, which may include any programming language, such as HTML, JSON, XML, etc., or any other format to effect generation and communication of requests and responses. Data Exchange Layer 203d may be disposed on a Service Layer 203c, which provides a transfer protocol or architecture for exchanging data among networked applications. For example, Service Layer 203c may provide for RESTful-compliant architectural and web services to facilitate GET, PUT, POST, DELETE, and PATCH methods or operations. In other examples, Service Layer 203c may provide for SOAP web services based on, for example, remote procedure calls ("RPCs"), or any other like services or protocols. Service Layer 203c may be disposed on a Transport Layer 203b, which may include protocols to provide host-to-host communications for applications via an HTTP or HTTPS protocol, in at least this example. Transport Layer 203b may be disposed on a Network Layer 203a, which, in at least this example, may include TCP/IP protocols and the like.

According to some examples, an application interface, such as an API, may be designed to include data representing any number of objects, properties, parameters, etc., and may be created as an application interface definition formatted in an application interface description language in accordance, for example, with an application interface specification. In some examples, definition editor 208 may be configured to generate an API as an application interface definition. An API description language may facilitate generation of a machine-readable description of the functionalities of an API as an API definition file. An API (e.g., an API definition file) may include data configured to drive execution or performance of any number of electronic or software-based processes and methods at a referent network location (e.g., a target network location, such as an endpoint, to which a reference points). In some cases, an API definition file may also include human-readable text. Hence, an API definition may include data that defines operation of one or more hardware or software processes, and, thus, may be equivalent to source code for a set of executable instructions.

An API definition may be written or otherwise formulated in accordance with one or more API specifications. In some cases, an API definition may be formed as a free-form text document. Or, the API definition may be created to comply with one or more application interface specifications. For example, an API definition may be formed to comply with the OpenAPI specification, which defines creation of a specific API definition in a machine-readable format. The OpenAPI specification is maintained by the OpenAPI Initiative™ at openapis(dot)org, which is part of the Linux Foundation®, and had been originally developed as "Swagger" by SmartBear Software™ at smartbear(dot)com. Hence, an application interface as described herein may be configured to comply with any version of OpenAPI Specification (e.g., version 2.0, 3.0, and others), or any other API specification, model, definition, or the like. Also, an API definition may be formed in other description languages, such as RESTful API Modeling Language ("RAML") at raml(dot)org, which is developed by Mulesoft, Inc®., or using API Blueprint™ definition language at apiblueprint (dot)org, which had been developed by Apiary, Inc., and acquired by Oracle®, Inc. Other examples of description languages for creating an application interface include Web Services Description Language ("WSDL"), Web Application Description Language ("WADL"), and the like. According to some examples, the term "application interface" may be interchangeable with the term "API," without limitation to a specific service, protocol, application, etc., and thus is not limited to RESTful architectural implementations.

In some examples, an API definition may describe operations that may be implemented by a business process (e.g., a method or process performed for or on behalf of an entity or enterprise and its data-driven processes). Such operations may consume inputs, such as data and business objects that support a business process. For example, consider a "customer" object is derived to support a computerized business process, whereby the customer business object may include fields to define attributes, properties, values, etc., for the customer business object. Operations or functions of a business object may be performed using inputs to contextualize the operation and change a state of a business (e.g., placing an order for a specific customer), or report on a state of a business or entity. Further, the operations performed by a business object may generate output data that may also include data representing one or more business objects.

An application interface, according to some examples, may be implemented as an application program interface ("API"), which may be a set of programming instructions formed to specify interoperability of one or more software components, any of which may be different applications that perform on different operating systems and different hardware platforms (e.g., different processors and accompanying circuitry). The one or more software components may be disposed locally or remotely relative to an application implementing an API. According to some examples, programmatic data representing any of application interfaces described in some implementations herein may include an API and/or a software connector.

Figure 3:
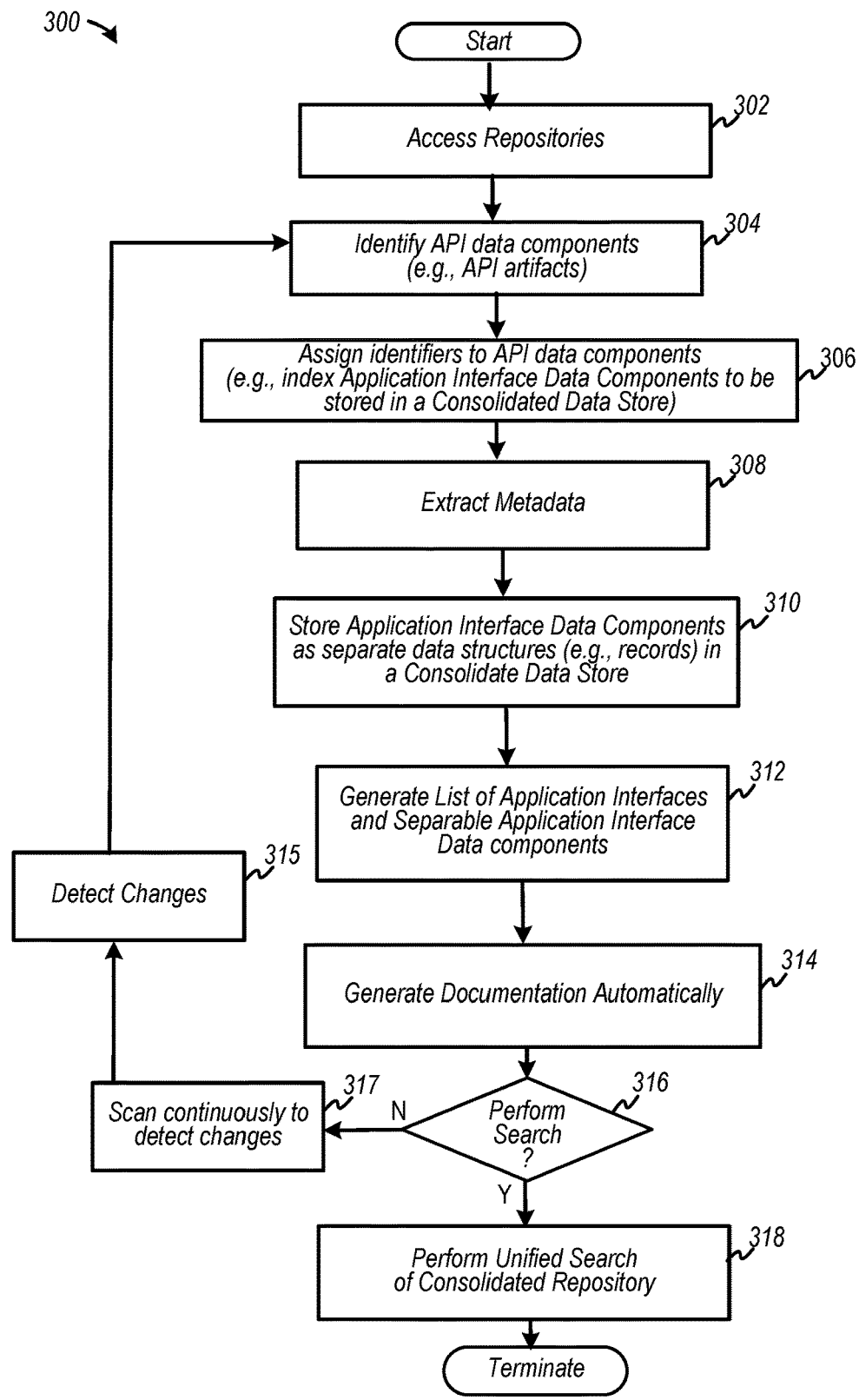
FIG. 3 is a flow diagram depicting an example operational flow of an application interface integration design management platform, according to some examples.

FIG. 3 is a flow diagram depicting an example operational flow of an application interface integration design management platform, according to some examples. At 302, data connections are formed to access a number of repositories (e.g., Git repositories) in which application interface data files or portions thereof, including API artifacts, may be stored as controlled revision API data. At 304, application interface data files and artifacts may be identified. Further, subsets of API component data (e.g., artifacts) may be identified as separable subsets or units of API component data that may be identified and separated from API design files from which they are extracted or derived. For example, a first/GET operation configured to fetch customer contact information may be identifies as being separable from a second/GET operation configured to fetch inventory information for a suite of merchant products. Thus, both /GET operations may be separately stored in different data structures (e.g., different records of file system in a consolidated data store).

At 306, each application interface data component may be stored as a record (or alternatively, as one or more indexed records), and may be associated or assigned with a unique identifier. Each unique identifier may be used to distinctly identify and access corresponding data records in a consolidated data store. In some examples, application interface data components may be indexed and stored in a consolidated repository. At 308, metadata associated with each application interface and/or each application interface data component may be extracted and stored in a corresponding record. Hence, the metadata may also be identified for indexing into a consolidated data store (e.g., inherently or along with data representing an API data component). At 310, separable application interface data components (e.g., artifacts) and metadata may be stored as records in a consolidated data storage device, whereby each of the records may include data representing a "subset" of source data derived from APIs. As such, a consolidated data store may include a single, unitary physical or logical repository that may be searched, accessed, managed, and updated as a "single source of truth," in accordance with at least one or more embodiments. With implementations of a logical repository, data stored therein may be a source of referential data (e.g., pointers) to portions of application interfaces that may constitute, for example, a newly-generated API.

At 312, a list of application interfaces (e.g., accessible within organization or enterprise) and associated application interface data components is generated. The list may also include data representing interdependencies among portions of one or more extracted application interface. For example, an operation associated with a first selected "chunk" or "portion" of an extracted application interface (e.g., as a record) may be dependent on an order of operation or other non-selected "portions" of any other extracted application interface portion (e.g., other records) or referenced data (e.g., located via "$ref"). At 314, API documentation may be generated automatically using records of a consolidated data store, whereby the records include uniquely addressable application interface data components (or artifacts). Hence, the automated API documentation process at 314 may generate information describing a combination of API structures and functionalities based on data consolidated from multiple distinctive repositories. Thus, automatically generated API documentation, in view of the various structures and/or functionalities described herein, may provide a global or aggregated view of application interfaces in an organization.

At 316, a determination may be made as to whether to perform a search. If so, flow 300 transitions to 318 at which a unified search of a consolidated data repository is performed. Otherwise, flow moves to 317 at which multiple repositories may be continuously scanned periodically (or aperiodically) to detect transitions of data states (e.g., changes in repository data). Changes may be detected at 315, after which flow 300 moves to 304 to identify at least modified application interface data components for further processing.

Figure 4:
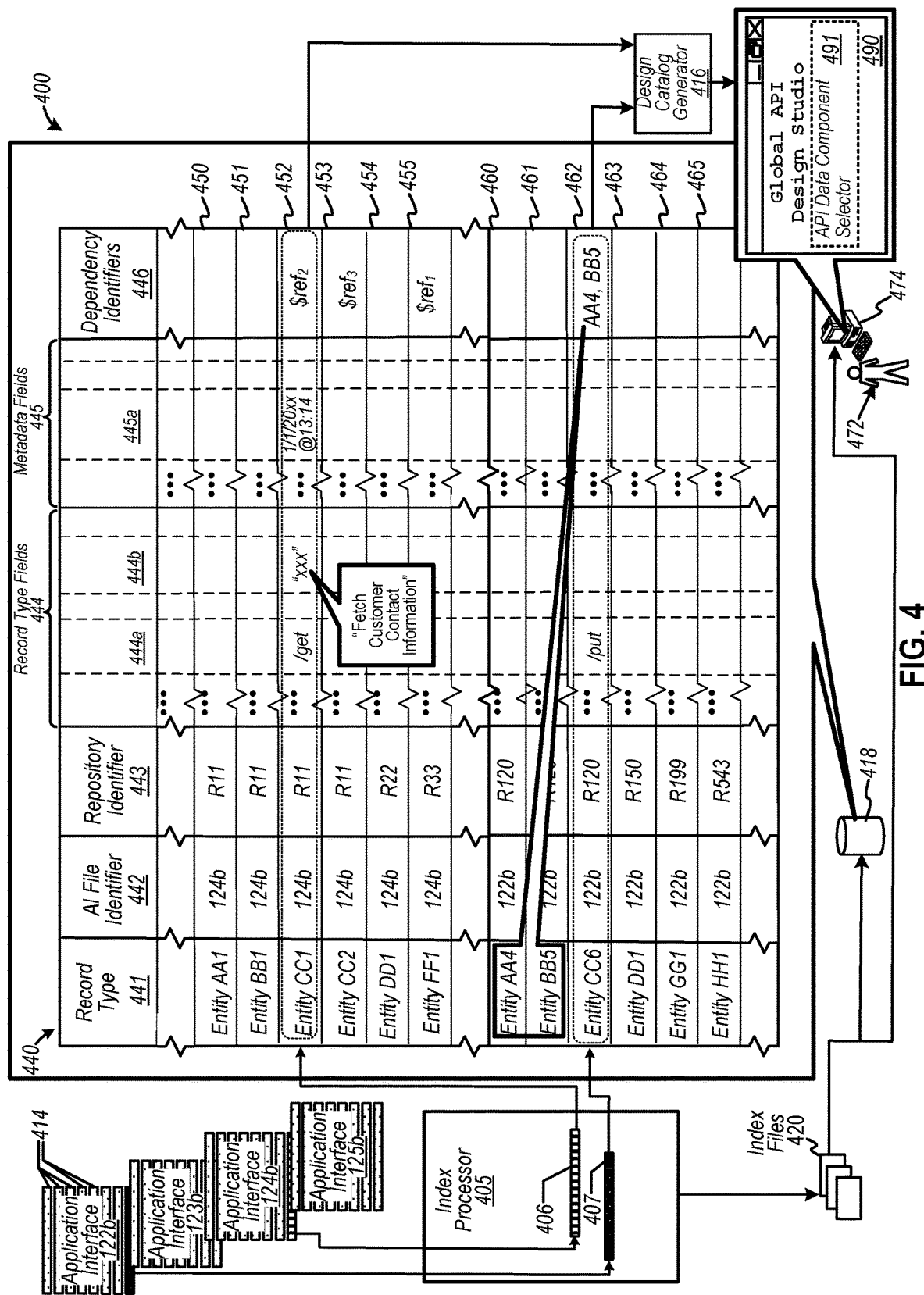
FIG. 4 is a diagram depicting an index processor configured to index one or more application interface data components into records of a file system of a consolidated data arrangement, according to some examples.

FIG. 4 is a diagram depicting an index processor configured to index one or more application interface data components into records of a file system of a consolidated data arrangement, according to some examples. Diagram 400 depicts extracted application interfaces 122b, 123b, 124b, and 125b of FIG. 1. For example, a repository analyzer may operate to identify constituent components 414 into which data representing application interfaces 122b, 123b, 124b, and 125b may be distilled into separate application interface ("API") data components (or API artifacts) 414. Further to diagram 400, index processor 405 may be configured to identify API data components 414, characterize one or more subsets of data corresponding to each API data component 414 to identify attributes, and store each API data component as one of records 450 to 455 or one of records 460 to 465 in a data file system constituting at least a portion 440 of a data arrangement for a consolidated data store, according to some examples.

Further to the example shown, consider that index processor 405 extracts an API data component 406 from application interface 124b and indexes the data into record 452, whereas index processor 405 extracts another API data component 407 from another application interface, such as application interface 122b. Index processor 405 may be further configured to index the data corresponding to API data component 407 into record 462.

In some examples, index processor 405 may be configured to identify data values of attributes for indexing those data values into a field of a record. In particular, index processor 405 may identify which attributes of each API data component may be disposed in a particular field in data arrangement portion 440 of a consolidated data arrangement stored in a repository 418. In some cases, column headings 441 to 446 may be indicative of an attribute type stored in fields of portion 440. As an example, consider that data values in field(s) 441 describe a record type, such as Entity AA1, Entity BB1, Entity CC1, etc., wherein each "Entity XX#" specifies an object type (e.g., a root object type including an OpenAPI version object, an "info" object, a "servers" object, a "paths" object, a "components" object, etc.). Thus, in this example, a record may be defined by an amount of source data (e.g., JSON data) associated with an API object, which may be used to demarcate and decompose each portion of an API into API data components.

In this example, consider that field 441 of record 452 includes data representing "Entity CC1," which specifies a record type based on a "path" object type. Field 442 of record 452 may be a data value of "124b," which may describe an attribute associated with data representing an application interface ("API") file identifier in fields 442. The data value "124b" indicates that data in record 452 may originate from application interface "124b." Field 443 of record 452 may be a data value of "R11" (e.g., repository #00011) that may describe a value for an attribute describing a unique repository identifier from which data in record 452 originates. Further, record type fields 444 may include any number of columns or fields that further include data values characterizing record type attributes. For example, field 444a of record 452 indicates that "path" object type "Entity CC1" includes a "/GET" operation. As another example, field 444b of record 452 indicates a data value "xxx" may include a text string as a description of the/GET operation, which is described in a text string as being configured to "fetch customer contact information." Further to this example, record 452 may include data values for attributes associated with metadata fields 445. For instance, field 445a of record may specify a "commit" date and time (e.g., "1/1/20XX @ 13:14) of a current revision of data in record 452, which may be derived or extracted from metadata associated with portion 406 of extracted application interface 124b. Other metadata fields 445 may include data values representing other metadata as attributes of a record (e.g., one of metadata fields 445 may include data values representing "user account identifiers," or any other types of metadata). Also, field 446 of record 452 may include a data value indicating a dependency of other data (e.g., external to API data component 406), such as a location of data referred to using a dependency identifier, such as "$ref$_2$."

Other records from 450 to 465 may also include data values for similar or equivalent attribute types and/or fields. For example, consider that record 462 may include data extracted from a portion 407 of application interface 122b, whereby record type field 441 includes a data value of "Entity CC6," which may describe a "paths" object including a "/PUT" operation, as indicated in record type field 444a of record 462. Note, too, that API data component 407 includes data representing dependencies on other records to ensure proper operation of an API generated to include data in record 462. For example, dependency identifiers field 446 of record 462 includes data values "AA4" and "BB5" that reference dependencies (e.g., computationally or order of operation) in records 460 and 461, respectively. Note that the above-described manner of dividing API component data by, for example, object type is merely one example of any number of techniques to divide separable data units of applications interfaces into usable blocks of atomic source data.

Further to FIG. 4, index processor 405 may optionally generate one or more index files 420 that may provide indices to identify specific data values of attributes disposed in records 450 to 465. Index files 420 may include data for facilitating search operations in which a user 472 inputs search criteria via computing device 474 to identify records with which to generate an API. For example, consider that user 472 specifies a search that includes data representing a "path" object including "/GET" or "/PUT," and additionally may include search criteria specifying a text search for string "customer." As such, search results may include references to records 452 and 462, both of which include data originating from distinctive repositories. Next, consider that user 472 accesses a user interface 490 configured to build a new API via data selected with user inputs 491 via a design catalog generator 416, which may be configured to also include other data referenced by, or referenced to, locations specified by dependency identifiers in fields 446. User 472 may select at least records 452, 460, 461, and 460, as well as data referenced by "$ref$_2$" in fields 446 to generate, build, test, validate, and deploy a new API based on data in a consolidated data store under control of a centralized design manager application.

Figure 5:
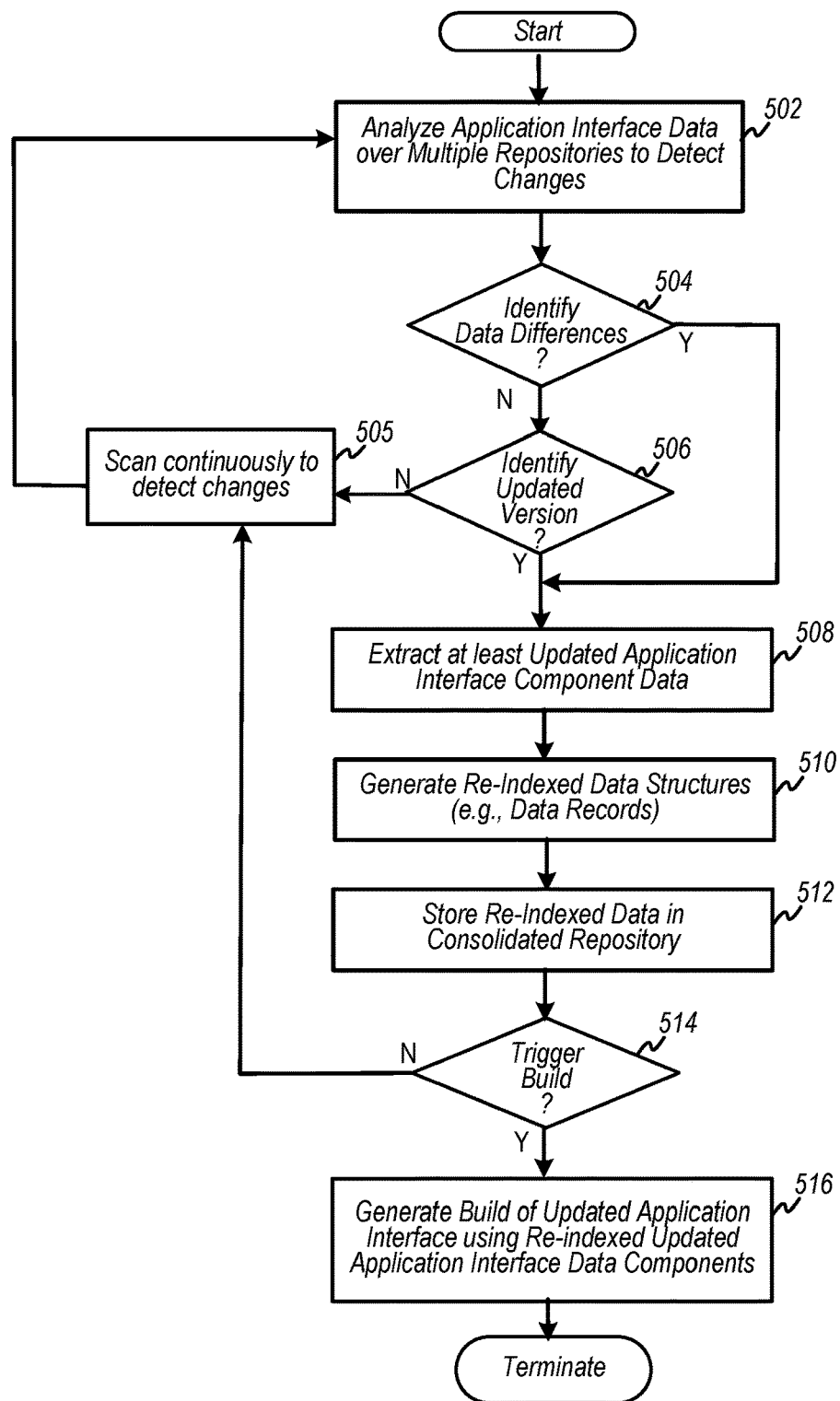
FIG. 5 is a flow diagram depicting another example operational flow of an application interface integration design management platform, according to some examples.

FIG. 5 is a flow diagram depicting another example operational flow of an application interface integration design management platform, according to some examples. At 502, data representing multiple application interfaces (e.g., multiple API design files) disposed in multiple version-controlled repositories may be analyzed to detect changes in data states. At 504, a determination may be made as to whether data representing APIs (or portions thereof) stored in any distinctive repository differs from corresponding extracted data stored in a consolidated data store. For example, data representing a pattern of data associated with a record stored in a consolidated data store may vary or not match a pattern of data that it may have previously matched. Thus, a mismatch in data or difference in data determine at 504 may be indicative of a revised data in a distinctive repository. If there is a difference, flow 500 transitions to 508. But if there is no difference detected at 504, flow 500 transitions to 506, at which a determination may be made as to whether metadata derived at a version-controlled repository indicates that API data has been revised (e.g., metadata may include a revision number). If not, flow 500 continues to 505 at which multiple repositories may be continuously scanned periodically (or aperiodically) to detect state transition of data (e.g., changes in repository data). Thereafter, flow 500 moves back to 502.

Continuing at 506, upon identifying an updated version to an API or a portion thereof, flow 500 continues to 508. At 508, at least a portion of an application interface may be extracted. For example, data extraction may be directed to extracting the changed or modified API artifacts and/or application interface data components (e.g., unchanged data need not be extracted). At 510, data in a consolidated repository may be re-indexed to include changes in application interface data components. For example, a new revision of an API may cause generation of new portions of source data for an upgraded API. In turn, new records may be generated to support modified record data. Note, some APIs may continue to rely or implement one or more previous revisions, and, as such, those records may remain stored in consolidated data store rather than being deleted.

At 512, re-indexed record data may be stored in a consolidated repository. Also, one or more index files may be generated to include the re-indexed record-related data. At 514, a determination may be made as to whether to trigger a build of an API that includes API data components in a consolidated data store, whereby data representing the API data components may be derived from other APIs stored in distinctive repositories that may have changed. If not, flow 500 continues to 505. Otherwise, flow 500 transitions to 516. At 516, a build of an updated application interface may be generated using re-indexed records that correspond to one or more updated application interface data components.

Figure 6:
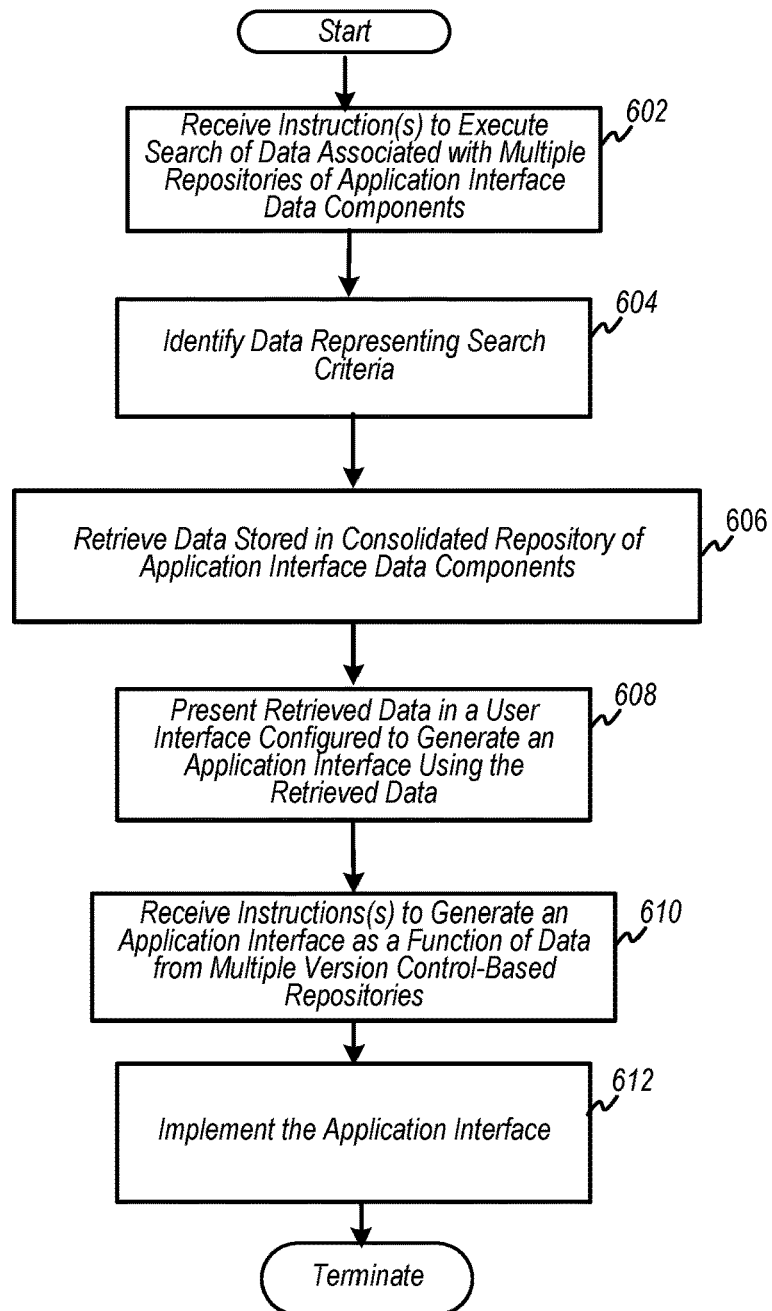
FIG. 6 is a flow diagram depicting an example operational flow in which a search of a consolidated data store may be implemented to create an application interface based on application interface data components from different origins, according to some examples.

FIG. 6 is a flow diagram depicting an example operational flow in which a search of a consolidated data store may be implemented to create an application interface based on application interface data components from different origins, according to some examples. At 602, one or more instructions to execute a search of data associated with multiple repositories of application interface data components may be received (e.g., by platform 100 of FIG. 1). In various examples, the search of the data associated with the multiple repositories may be performed on extracted application interface data components stored in a consolidated data repository. At 604, data representing search criteria may be received into, for example, a search application. In various examples, search criteria may include one or more of (1) data representing data patterns, (2) data representing objects, (3) data representing parameters, (4) data representing properties, (5) data representing text strings, (6) data representing 'endpoints,' (7) data representing API documentation or other electronic documentation, (8) data representing 'models,' and the like, or any other API-related data. At 606, data stored in a consolidated repository may be retrieved responsive to receiving data representing the search criteria.

At 608, data retrieved responsive to a search may be presented in a user interface configured to generate an application interface (e.g., a newly-generated API) based on retrieved data representing portions of source data extracted from APIs stored over any number of distinctive repositories under control of a version-tracking application. At 610, data representing one or more instructions may be received, for example, by a design catalog generator to generate a new API as a function of data extracted or derived from multiple version control-based repositories (e.g., multiple Git repositories). At 612, a newly-generated application interface, or API, may be implemented (e.g., deployed for use by any user or other API for which authorization has been provided).

FIG. 7 is a diagram depicting an example of an application interface development system implementing an application interface integration design management platform, according to some examples. Diagram 700 depicts an application interface development system 701 including an application interface design program 720, a version control application 724, a workflow engine 730, an application interface integration design manager 710, and an application interface endpoint service module 760. Application interface development system 701 may include hardware, software, or a combination thereof, and may be configured to include structures and/or functionalities as similarly-named or similarly-numbered elements depicted in other drawings, or as otherwise described herein, in accordance with one or more examples, such as described relative to FIG. 1 or any other figure or description herein.

Application interface design program 720 may be implemented as an application configured to, for example, implement an integrated development environment ("IDE") to design an application interface (e.g., an API) based on application interface data components stored in a consolidated repository. In some examples, application interface design program 720 may be implemented using, for example, Stoplight API Design Studio™ (or any other API Design manager) of Stoplight, Inc., Austin, Tex., U.S.A., or any equivalent API design application. Version controlled application 724 that may include distributed version-control programs to detect changes in repository data in distinctive databases and/or repositories 726. An example of version control application 724 includes executable instructions that implement Git-based repositories. In some examples, workflow engine 730 may be an application configured to operate as a "continuous integration pipeline" in which processes of workflow engine 730 may be triggered by trigger data 731 to automatically generate an application interface, test the application interface build, validate the application interface build, and deploy the application interface for use in production.

Further to diagram 700, application interface integration design manager 710 may include a discovery module 711, which may include a repository analyzer 712. Discovery module 711 may include logic configured to discover automatically changes or updates to APIs and their constituent components (e.g., API artifacts) using, for example, repository analyzer 712, which may have one or more functionalities as described herein. Application interface integration design manager 710 is also shown to include a design catalog generator 716, which may operate as described herein, and a test simulator 717. Test simulator 717 may be an application configured to instantiate one or more "mock" or virtual servers to test and/or validate operability of the newly-designed API or build. Application interface endpoint service module 760 may include executable instructions to provide one or more of an API build tool, an API developer portal, and an API Gateway to deploy an application interface, according to some examples.

To illustrate operation of application interface development system 701, in accordance with at least one example, consider that a user 702 desires to create an API via a user interface of computing device 704. The user interface may be configured to display user inputs that may be configured to transmit data instructions to application interface design program 720. In some cases, user 702 may transmit data 723 representing a search request to access a consolidated data store including records or other data structures. As described in some examples herein, the consolidated data store may be configured to provide a unitary view of API-related information for APIs developed and stored across various groups (e.g., business units) of an organization or enterprise. Data 725 representing search results may be retrieved responsive to searching a consolidated data store.

Next, consider computing device causes generation of a new API and causes transmission of both API data and a "commit" instruction as data 721 to version control application 724. Subsequently, version control application 724 may generate data 731 representing an instruction to trigger a build of the new API. Workflow engine 730, in response, may transmit data 733 to analyze, for example, whether other API data components may be included based on interdependency with one or more other API data components in the new API. Also, data 733 may also be configured to analyze whether data stored in a consolidated data store may need to be updated to provide appropriate versions of API source data. Data 735 may be transmitted to workflow engine 730 to include additional API constituent components and/or upgraded source data as "discovered" data. Thereafter, data 737 may be configured to initiate testing and validation of an API build using a test simulator 717. Upon validation, workflow engine 730 may generate data 739 requesting creation of an endpoint based on a new, validated API. Application interface endpoint service module 760 may configured to deploy the new API by transmitting API service data 761 to one or more computing devices or repositories to implement the new API "in production." Thus, API service data 761 may be accessible by any other deployed API for performing API-related functions by any other entity, enterprise, organization, or person.

Figure 8:
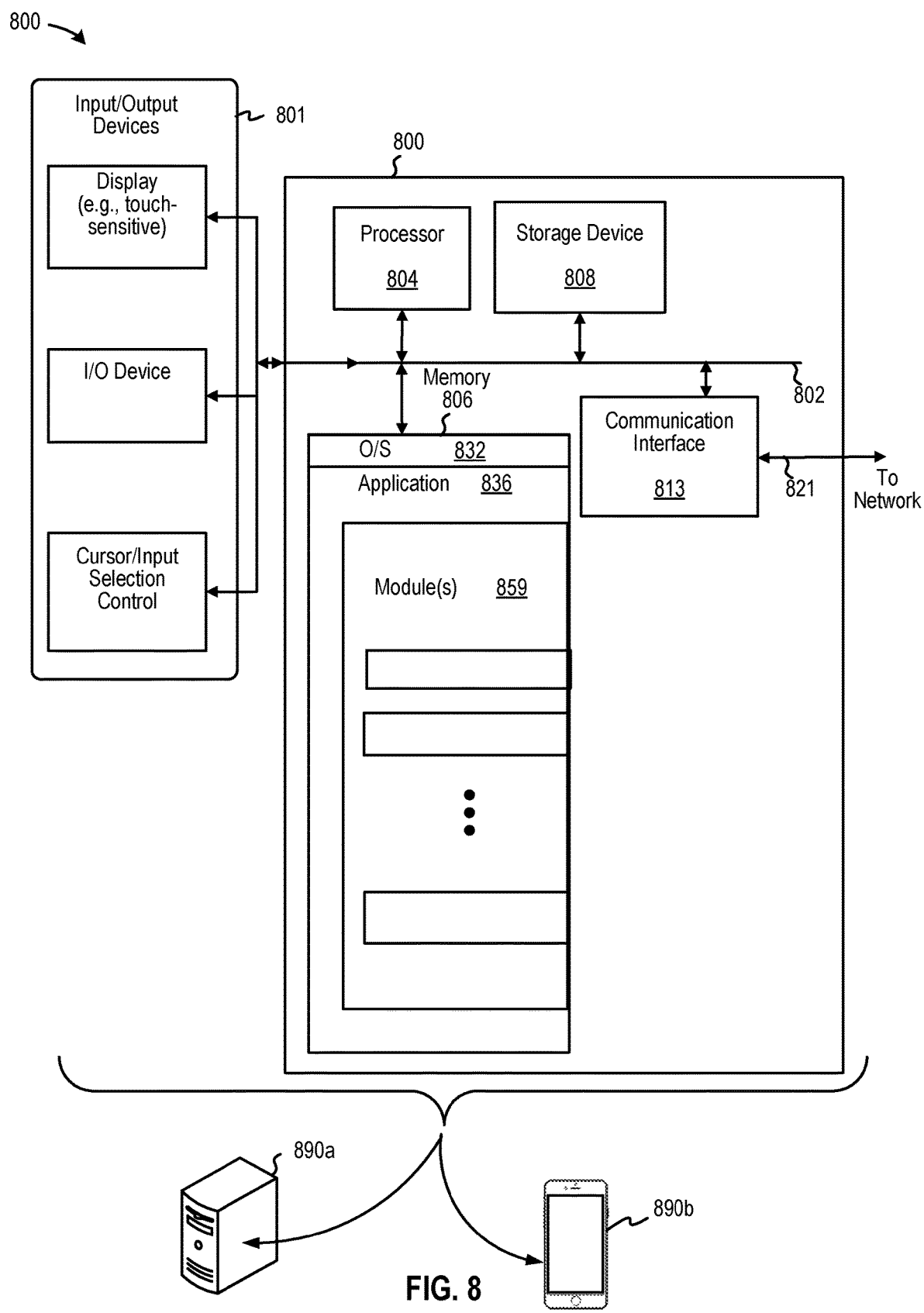
FIG. 8 illustrates examples of various computing platforms configured to provide various functionalities to any of one or more components of an application interface integration design management platform, according to various embodiments.

FIG. 8 illustrates examples of various computing platforms configured to provide various functionalities to any of one or more components of an application interface integration design management platform, according to various embodiments. In some examples, computing platform 800 may be used to implement computer programs, applications, methods, processes, algorithms, or other software, as well as any hardware implementation thereof, to perform the above-described techniques.

In some cases, computing platform 800 or any portion (e.g., any structural or functional portion) can be disposed in any device, such as a computing device 890a, mobile computing device 890*b*, and/or a processing circuit in association with the various examples described herein.

Computing platform 800 includes a bus 802 or other communication mechanism for communicating information, which interconnects subsystems and devices, such as processor 804, system memory 806 (e.g., RAM, etc.), storage device 808 (e.g., ROM, etc.), an in-memory cache (which may be implemented in RAM 806 or other portions of computing platform 800), a communication interface 813 (e.g., an Ethernet or wireless controller, a Bluetooth controller, NFC logic, etc.) to facilitate communications via a port on communication link 821 to communicate, for example, with a computing device, including mobile computing and/or communication devices with processors, including database devices (e.g., storage devices configured to store atomized datasets, including, but not limited to triplestores, etc.). Processor 804 can be implemented as one or more graphics processing units ("GPUs"), as one or more central processing units ("CPUs"), such as those manufactured by Intel® Corporation, or as one or more virtual processors, as well as any combination of CPUs and virtual processors. Computing platform 800 exchanges data representing inputs and outputs via input-and-output devices 801, including, but not limited to, keyboards, mice, audio inputs (e.g., speech-to-text driven devices), user interfaces, displays, monitors, cursors, touch-sensitive displays, LCD or LED displays, and other I/O-related devices.

Note that in some examples, input-and-output devices 801 may be implemented as, or otherwise substituted with, a user interface in a computing device associated with a user account identifier (e.g., a API developer associated with a subset of API design files) in accordance with the various examples described herein.

According to some examples, computing platform 800 performs specific operations by processor 804 executing one or more sequences of one or more instructions stored in system memory 806, and computing platform 800 can be implemented in a client-server arrangement, peer-to-peer arrangement, or as any mobile computing device, including smart phones and the like. Such instructions or data may be read into system memory 806 from another computer readable medium, such as storage device 808, or any other data storage technologies, including blockchain-related techniques. In some examples, hard-wired circuitry may be used in place of or in combination with software instructions for implementation. Instructions may be embedded in software or firmware. The term "computer readable medium" refers to any tangible medium that participates in providing instructions to processor 804 for execution. Such a medium may take many forms, including but not limited to, non-volatile media and volatile media. Non-volatile media includes, for example, optical or magnetic disks and the like. Volatile media includes dynamic memory, such as system memory 806.

Known forms of computer readable media includes, for example, floppy disk, flexible disk, hard disk, solid state hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can access data. Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 802 for transmitting a computer data signal.

In some examples, execution of the sequences of instructions may be performed by computing platform 800. According to some examples, computing platform 800 can be coupled by communication link 821 (e.g., a wired network, such as LAN, PSTN, or any wireless network, including WiFi of various standards and protocols, Bluetooth®, NFC, Zig-Bee, etc.) to any other processor to perform the sequence of instructions in coordination with (or asynchronous to) one another. Computing platform 800 may transmit and receive messages, data, and instructions, including program code (e.g., application code) through communication link 821 and communication interface 813. Received program code may be executed by processor 804 as it is received, and/or stored in memory 806 or other non-volatile storage for later execution.

In the example shown, system memory 806 can include various modules that include executable instructions to implement functionalities described herein. System memory 806 may include an operating system ("O/S") 832, as well as an application 836 and/or logic module(s) 859. In the example shown in FIG. 8, system memory 806 may include any number of modules 859, any of which, or one or more portions of which, can be configured to facilitate any one or more components of a computing system (e.g., a client computing system, a server computing system, etc.) by implementing one or more functions described herein.

The structures and/or functions of any of the above-described features can be implemented in software, hardware, firmware, circuitry, or a combination thereof. Note that the structures and constituent elements above, as well as their functionality, may be aggregated with one or more other structures or elements. Alternatively, the elements and their functionality may be subdivided into constituent sub-elements, if any. As software, the above-described techniques may be implemented using various types of programming or formatting languages, frameworks, syntax, applications, protocols, objects, or techniques. In some examples, the described techniques may be implemented as a computer program or application (hereafter "applications") or as a plug-in, module, or sub-component of another application. The described techniques may be implemented as software, hardware, firmware, circuitry, or a combination thereof. If implemented as software, the described techniques may be implemented using various types of programming, development, scripting, or formatting languages, frameworks, syntax, applications, protocols, objects, or techniques, including Python™, ASP, ASP.net, .Net framework, any API architecture, such as REST, etc., Ruby, Ruby on Rails, C, Objective C, C++, C#, Adobe® Integrated Runtime™ (Adobe® AIR™), ActionScript™, Flex™, Lingo™, Java™, JSON, Javascript™, Ajax, Perl, COBOL, Fortran, ADA, Microsoft®.NET, Node.js, XML, YAML, RAML, MXML, HTML, DHTML, XHTML, HTTP, XMPP, PHP, and others, including SQL™, SPARQL™, Turtle™, etc. The described techniques may be varied and are not limited to the embodiments, examples or descriptions provided.

As hardware and/or firmware, the above-described techniques may be implemented using various types of programming or integrated circuit design languages, including hardware description languages, such as any register transfer language ("RTL") configured to design field-programmable gate arrays ("FPGAs"), application-specific integrated circuits ("ASICs"), or any other type of integrated circuit. According to some embodiments, the term "module" can refer, for example, to an algorithm or a portion thereof, and/or logic implemented in either hardware circuitry or software, or a combination thereof. These can be varied and are not limited to the examples or descriptions provided.

In some embodiments, modules 859 of FIG. 8, or one or more of their components, or any process or device described herein, can be in communication (e.g., wired or wirelessly) with a mobile device, such as a mobile phone or computing device, or can be disposed therein. In some cases, a mobile device, or any networked computing device (not shown) in communication with one or more modules 859 or one or more of its/their components (or any process or device described herein), can provide at least some of the structures and/or functions of any of the features described herein. As depicted in the above-described figures, the structures and/or functions of any of the above-described features can be implemented in software, hardware, firmware, circuitry, or any combination thereof. Note that the structures and constituent elements above, as well as their functionality, may be aggregated or combined with one or more other structures or elements. Alternatively, the elements and their functionality may be subdivided into constituent sub-elements, if any. As software, at least some of the above-described techniques may be implemented using various types of programming or formatting languages, frameworks, syntax, applications, protocols, objects, or techniques. For example, at least one of the elements depicted in any of the figures can represent one or more algorithms. Or, at least one of the elements can represent a portion of logic including a portion of hardware configured to provide constituent structures and/or functionalities.

According to some embodiments, the term "circuit" can refer, for example, to any system including a number of components through which current flows to perform one or more functions, the components including discrete and complex components. Examples of discrete components include transistors, resistors, capacitors, inductors, diodes, and the like, and examples of complex components include memory, processors, analog circuits, digital circuits, and the like, including field-programmable gate arrays ("FPGAs"), application-specific integrated circuits ("ASICs"). Therefore, a circuit can include a system of electronic components and logic components (e.g., logic configured to execute instructions, such that a group of executable instructions of an algorithm, for example, and, thus, is a component of a circuit). According to some embodiments, the term "module" can refer, for example, to an algorithm or a portion thereof, and/or logic implemented in either hardware circuitry or software, or a combination thereof (i.e., a module can be implemented as a circuit). In some embodiments, algorithms and/or the memory in which the algorithms are stored are "components" of a circuit. Thus, the term "circuit" can also refer, for example, to a system of components, including algorithms. These can be varied and are not limited to the examples or descriptions provided. Further, none of the above-described implementations are abstract, but rather contribute significantly to improvements to functionalities and the art of computing devices.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

The invention claimed is:

1. A method comprising:
    identifying data representing application interfaces distributed in one or more different repositories managed via a version control computer-implemented application;
    indexing portions of the application interfaces;
    detecting automatically a subset of the portions of the application interfaces associated with one or more transitions of state based on the version control computer-implemented application;
    extracting from the one or more different repositories at least data representing the subset of portions of the application interfaces associated with the one or more transitions of state;
    storing the data representing the subset of portions of the application interfaces in a consolidated data storage as a data source with which to generate an application interface;
    implementing a search application configured to receive data representing search criteria to apply against the consolidated data storage to identify at least one of the portions of the application interfaces to generate the application interface; and
    causing transmission of application interface data and data representing a commit instruction to activate a version control application,
    wherein indexing the portions of application interfaces includes forming data structures formatted association with an application programming interface ("API") specification.

2. The method of claim 1 wherein indexing the portions of the application interfaces comprises:
    associating unique portion identifiers to each portion of the application interfaces distributed in the one or more different repositories.

3. The method of claim 1 further comprising:
    indexing the portions of application interface into records of a file system of a consolidated data arrangement.

4. The method of claim 1 further comprising:
    indexing the portions of application interface design files and metadata.

5. The method of claim 4 wherein the metadata is generated in association of operation of the version control computer-implemented application.

6. The method of claim 1 wherein detecting automatically a transition of state associated with a portion of an application interface comprises:
    determining a change in data representing versioning metadata.

7. The method of claim 1 wherein detecting automatically a transition of state associated with a portion of an application interface comprises:
    determining a difference of data associated with a portion of an application interface in a repository and data stored in the consolidated data storage.

8. The method of claim 1 wherein implementing the search application comprises:
    executing instructions to cause the search application to present a search user interface including user inputs configured to select a subset of search criteria data; and
    receiving the search criteria data.

9. The method of claim 8 wherein receiving the search criteria data comprises:
    receiving data representing one or more of an object type, a property type, and a string.

10. The method of claim 9 wherein receiving the data representing the object type comprises:
receiving data representing one or more of a path object, an operation object, a request object, and a response object.

11. The method of claim 9 wherein receiving the data representing the object type comprises:
an object specified in an application interface definition file.

12. The method of claim 8 further comprising:
receiving data representing search results; and
generating the application interface based on the search results to form a generated application interface.

13. The method of claim 12 further comprising:
disposing one or more portions of the generated application interface in the one or more different repositories; and
updating the consolidated data storage to include data representing the one or more portions of the generated application interface.

14. The method of claim 1 further comprising:
updating automatically data representing a documentation format to include information based on a detected transition of a state of a portion of an application interface to form one or more updated documentation data files; and
publishing the one or more updated documentation data files.

15. The method of claim 1 further comprising:
storing the data representing the subset of portions of the application interfaces in one or more data storages as a source of referential data for the portions of application interfaces.

16. An apparatus comprising:
a memory including executable instructions; and
a processor, responsive to executing the instructions, is configured to:
identify data representing application interfaces distributed in one or more different repositories managed via a version control computer-implemented application;
index portions of the application interfaces;
detect automatically a subset of the portions of the application interfaces associated with one or more transitions of state based on the version control computer-implemented application;
extract from the one or more different repositories at least data representing the subset of portions of the application interfaces associated with the one or more transitions of state;
store the data representing the subset of portions of the application interfaces in a consolidated data storage as a data source with which to generate an application interface;
implement a search application configured to receive data representing search criteria to apply against the consolidated data storage to identify at least one of the portions of the application interfaces to generate the application interface; and
cause transmission of application interface data and data representing a commit instruction to activate a version control application,
wherein the processor is configured to index the portions of application interfaces to form data structures formatted in association with an application programming interface ("API") specification.

17. The apparatus of claim 16 wherein a subset of the instructions to index the portions of the application interfaces further causes the processor to:
associate unique portion identifiers to each portion of the application interfaces distributed in the one or more different repositories.

18. The apparatus of claim 16 wherein a subset of the instructions to implement the search application further causes the processor to:
execute instructions to cause the search application to present a search user interface including user inputs configured to select a subset of search criteria data; and
receive the search criteria data.

19. The apparatus of claim 18 wherein the subset of the instructions is further configured to cause the processor to:
receive data representing search results; and
generate the application interface based on the search results to form a generated application interface.

20. The apparatus of claim 19 wherein the subset of the instructions is further configured to cause the processor to:
dispose one or more portions of the generated application interface in the one or more different repositories; and
update the consolidated data storage to include data representing the one or more portions of the generated application interface.

* * * * *